US007689547B2

(12) United States Patent
Cristofor et al.

(10) Patent No.: US 7,689,547 B2
(45) Date of Patent: Mar. 30, 2010

(54) ENCRYPTED DATA SEARCH

(75) Inventors: Elena Daniela Cristofor, Redmond, WA (US); Laurentiu Bogdan Cristofor, Redmond, WA (US); Tanmoy Dutta, Redmond, WA (US); Raul Garcia, Kirkland, WA (US); Sung L. Hsueh, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 544 days.

(21) Appl. No.: 11/516,267

(22) Filed: Sep. 6, 2006

(65) Prior Publication Data

US 2008/0059414 A1 Mar. 6, 2008

(51) Int. Cl.
*G06F 17/30* (2006.01)

(52) U.S. Cl. .............................. 707/3; 380/28; 380/59; 713/189; 726/26

(58) Field of Classification Search ...................... 707/2, 707/3; 380/59, 28; 713/189; 726/26
See application file for complete search history.

(56) References Cited

U.S. PATENT DOCUMENTS

| 4,827,508 | A | * | 5/1989 | Shear ........................... 705/53 |
| 5,293,576 | A | * | 3/1994 | Mihm et al. ................. 713/170 |
| 5,319,779 | A | * | 6/1994 | Chang et al. .................. 707/3 |
| 5,495,533 | A | | 2/1996 | Linehan et al. |
| 5,692,124 | A | | 11/1997 | Holden et al. |
| 5,694,569 | A | | 12/1997 | Fischer |
| 5,701,469 | A | * | 12/1997 | Brandli et al. .............. 707/102 |
| 5,742,807 | A | * | 4/1998 | Masinter ........................ 707/1 |
| 5,799,088 | A | * | 8/1998 | Raike .......................... 380/30 |
| 5,854,916 | A | * | 12/1998 | Nachenberg ................. 703/21 |
| 5,864,852 | A | * | 1/1999 | Luotonen ..................... 726/14 |
| 5,990,810 | A | * | 11/1999 | Williams ...................... 341/51 |
| 6,012,057 | A | * | 1/2000 | Mayer et al. .................... 707/6 |
| 6,052,686 | A | | 4/2000 | Fernandez et al. |
| 6,233,685 | B1 | | 5/2001 | Smith et al. |
| 6,446,052 | B1 | * | 9/2002 | Juels ........................... 705/69 |
| 6,601,026 | B2 | | 7/2003 | Appelt et al. |
| 6,622,248 | B1 | * | 9/2003 | Hirai .......................... 713/193 |

(Continued)

OTHER PUBLICATIONS

International Search Report, PCT/US2007/076758, Jan. 10, 2008, pp. 1-10.

(Continued)

*Primary Examiner*—James Trujillo
*Assistant Examiner*—William Spieler
(74) *Attorney, Agent, or Firm*—Capitol City TechLaw; Richard C. Irving

(57) ABSTRACT

An indexing value may be determined, transparently with respect to a requester, based on a desired plaintext item of data and a cryptographic key. The indexing value may be used to access an entry in an indexing structure to obtain a corresponding database entry which includes a non-deterministically encrypted ciphertext item. In another embodiment, an indexing structure for a database may be accessed. Positions of items of the indexing structure may be based on corresponding plaintext items. References related to the corresponding plaintext items in the indexing structure may be encrypted and other information in the indexing structure may be unencrypted. A portion of the indexing structure may be loaded into a memory and at least one of the encrypted references related to one of the plaintext items may be decrypted. The decrypted reference may be used to access a corresponding non-deterministically encrypted data item from the database.

7 Claims, 7 Drawing Sheets

U.S. PATENT DOCUMENTS

| | | | |
|---|---|---|---|
| 6,738,766 B2 * | 5/2004 | Peng | 707/6 |
| 6,928,428 B1 * | 8/2005 | De Vries | 707/3 |
| 7,000,118 B1 | 2/2006 | Murthy et al. | |
| 7,065,579 B2 | 6/2006 | Traversat et al. | |
| 2001/0019614 A1 | 9/2001 | Madoukh | |
| 2002/0038296 A1 * | 3/2002 | Margolus et al. | 707/1 |
| 2002/0049909 A1 * | 4/2002 | Jackson et al. | 713/188 |
| 2002/0059281 A1 * | 5/2002 | Watanabe et al. | 707/100 |
| 2002/0112152 A1 * | 8/2002 | VanHeyningen et al. | 713/151 |
| 2002/0120763 A1 * | 8/2002 | Miloushev et al. | 709/230 |
| 2002/0188605 A1 * | 12/2002 | Adya et al. | 707/4 |
| 2003/0007637 A1 * | 1/2003 | Banks | 380/51 |
| 2003/0046572 A1 | 3/2003 | Newman et al. | |
| 2003/0123671 A1 | 7/2003 | He et al. | |
| 2003/0159054 A1 * | 8/2003 | Fauble et al. | 713/189 |
| 2003/0177115 A1 * | 9/2003 | Stern et al. | 707/4 |
| 2003/0204515 A1 * | 10/2003 | Shadmon et al. | 707/100 |
| 2004/0255133 A1 | 12/2004 | Lei et al. | |
| 2004/0267747 A1 * | 12/2004 | Choi et al. | 707/8 |
| 2005/0004924 A1 * | 1/2005 | Baldwin | 707/100 |
| 2006/0053112 A1 | 3/2006 | Chitkara et al. | |
| 2006/0095791 A1 | 5/2006 | Wong | |
| 2006/0123250 A1 | 6/2006 | Maheshwari et al. | |

OTHER PUBLICATIONS

Agrawal, et al, "Order Preserving Encryption for Numeric Data", Date: 2004, pp. 563-574, ACM Press, New York, USA, http://delivery.acm.org/10.1145/1010000/1007632/p563-agrawal.pdf?key1=1007632&key.

Davida, et al, "A Database Encryption System with Subkeys", Date: 1981, pp. 312-328, vol. 6, Issue 2, ACM Press, New York, USA, http://delivery.acm.org/10.1145/320000/319580/p312-davida.pdf?key1=319580&key2=39.

Feigenbaum, et al, "Cryptographic Protection of Databases and Software", Date: Aug. 15, 1989, http://guinness.cs.stevens-tech.edu/~rwright/Publications/dim91.ps.

Iyer, et al, "A Framework for Efficient Storage Security in RDBMS", http://www.ics.uci.edu/~gts/paps/edbt-2004.pdf.

* cited by examiner

ENCRYPTED DATA SEARCH

BACKGROUND

Companies use database systems to store and search data used in various aspects of their businesses. The data may include as many as several million records, at least some of which the companies wish to keep private, such as, for example, customer information. Such information may be of value to others who may have a malicious intent. If a company's adversary was able to obtain such private information, the adversary could create problems for the company, its customers, or both.

One common method used to protect valuable information in a database and to comply with privacy regulations or policies is encryption. However, use of encrypted data in a database raises other issues, such as, for example, how to permit authorized access to the data by existing applications and how to find particular items of the data without decrypting all of the data and performing a linear search.

Existing database systems solved the above-mentioned problems by using what can be called deterministic encryption. In such database systems, an item of plaintext will always be encrypted to the same ciphertext when using the same encryption key. Examples of deterministic encryption include use of block ciphers in electronic codebook (ECB) mode or use of a constant initialization vector (IV). Because deterministic encryption always encrypts the same plaintext to the same ciphertext when using a given cryptographic key, data patterns may be recognizable, resulting in information leakage. This is especially a problem when data to be encrypted is too large to fit into a single block, which may be 8 or 16 bytes in length, depending on which block cipher algorithm is used.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments discussed below relate to database systems in which searching may be performed on non-deterministically encrypted data.

In one embodiment, a search for a data item corresponding to a non-deterministically encrypted ciphertext item of an encrypted column of a database may be performed by using an indexing structure corresponding to the encrypted column of the database. A code may be calculated, transparently with respect to a requester, based on the data item and a cryptographic key. The code may be used as an index to the indexing structure, which may have entries organized according to respective codes based on corresponding data items and the cryptographic key. In some implementations, each of the entries of the indexing structure may include the respective code and data for accessing a row of a database that includes a corresponding non-deterministically encrypted ciphertext item of the encrypted column of the database.

In another embodiment, a search for a desired data item corresponding to a non-deterministically encrypted ciphertext item of an encrypted column of a database may be performed by accessing an indexing structure corresponding to the encrypted column of the database. Entries of the indexing structure may be organized according to plaintext data items corresponding to non-deterministically encrypted ciphertext items of the encrypted column of the database. In the indexing structure, references related to the corresponding plaintext data items may be encrypted and other information in the indexing structure may be unencrypted. The search may be performed by loading at least a portion of the indexing structure into a memory, accessing an entry of the indexing structure, and decrypting at least one of the references of the entry of the indexing structure. The at least one decrypted reference may be used to access a row of the database including a corresponding non-deterministically encrypted ciphertext item of the encrypted column of the database.

DRAWINGS

In order to describe the manner in which the above-recited and other advantages and features can be obtained, a more particular description is described below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure.

Exemplary Operating Environment

Figure 1:
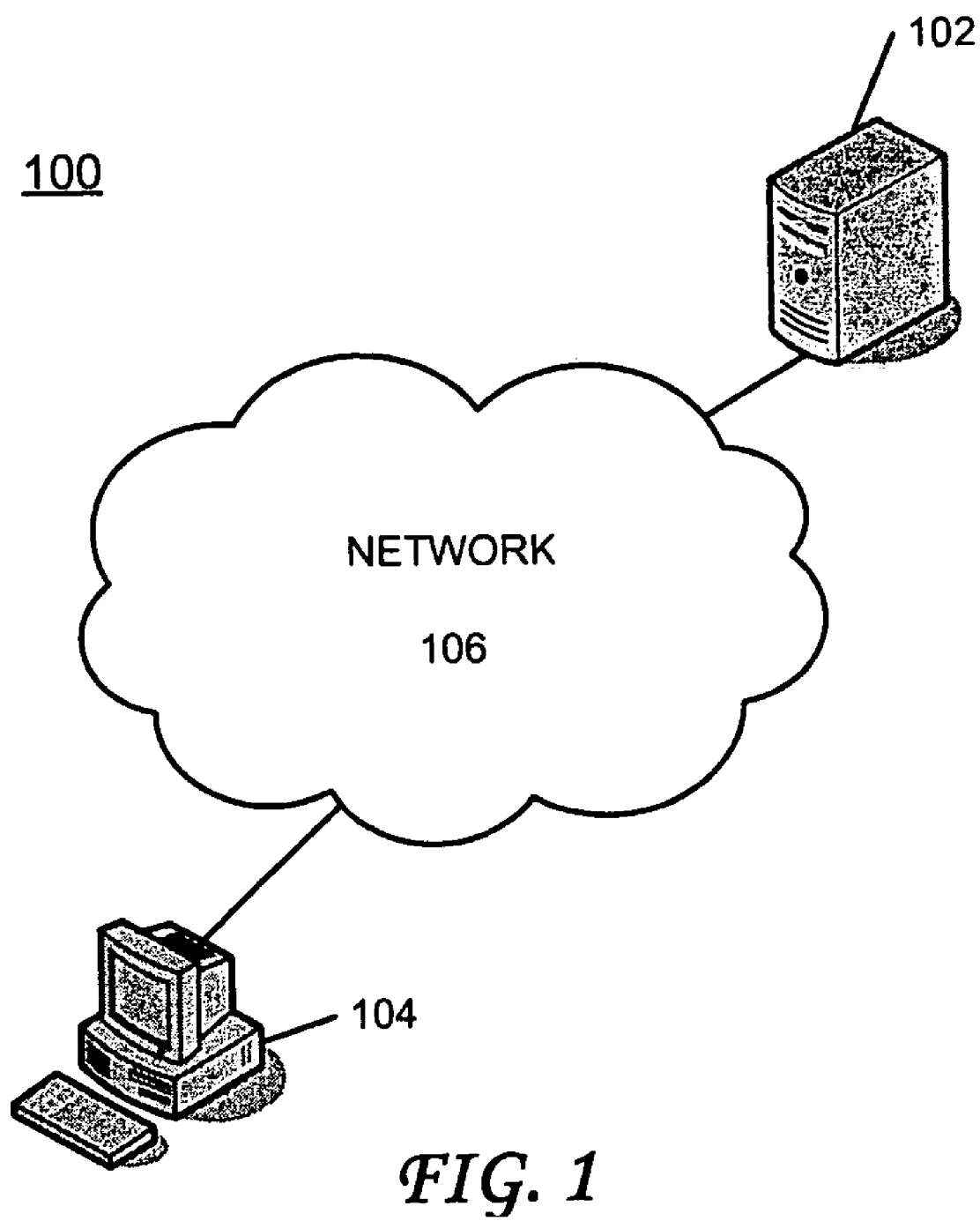
FIG. 1 illustrates an exemplary operating environment consistent with the subject matter of this disclosure.

FIG. 1 illustrates an exemplary operating environment 100 for an embodiment consistent with subject matter of this disclosure. Operating environment 100 may include processing device 102, processing device 104 and network 106.

Processing device 102 may be, for example, a server or other processing device capable of executing a database system. Processing device 104 may be a personal computer (PC) or other processing device capable of executing applications and communicating with processing device 102 via network 106.

Network 106 may be a wired or wireless network and may include a number of devices connected via wired or wireless means. Network 104 may include only one network or a number of different networks, some of which may be networks of different types.

In operating environment 100, processing device 104 may execute an application, which accesses information in a database of processing device 102 via network 106. The application may create, delete, read or modify data in the database of processing device 102.

FIG. 1 illustrates an exemplary operating environment. Other operating environments or variations of operating environment 100 may be used with other embodiments consistent with the subject matter of this disclosure. For example, FIG. 1 illustrates processing device 102 and processing device 104 as being separate devices. However, processing devices 102 and 104 may be combined in a single processing device in one embodiment. In such an embodiment, the operating environment may not include network 106. In another embodiment, functions or services performed by processing device 102 may be distributed across multiple processing devices which may be connected via a network, such as, for example, network 106.

Exemplary Processing Device

Figure 2:
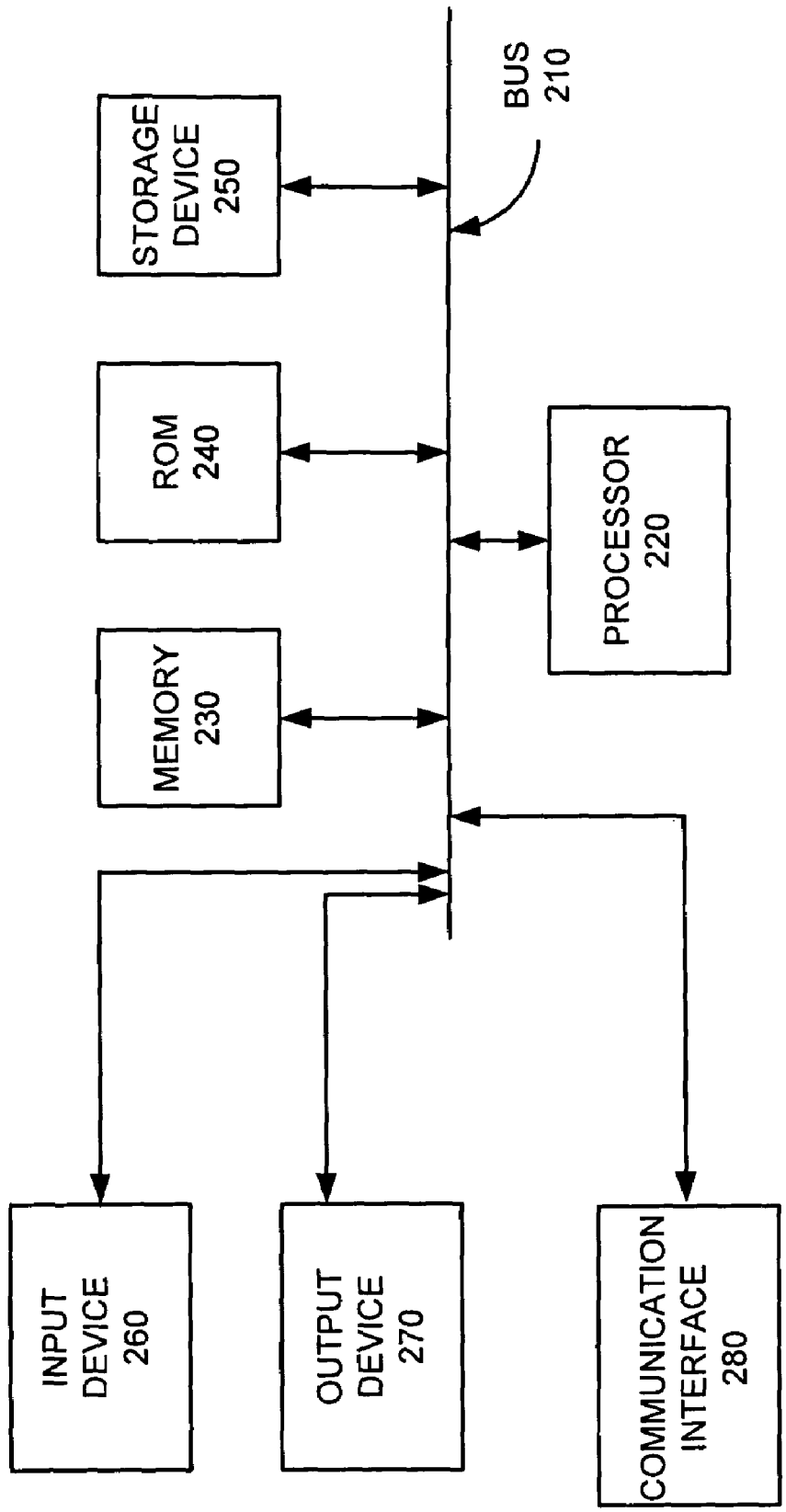
FIG. 2 is a functional block diagram of an exemplary processing device that may be used to implement processing device 102 of FIG. 1, processing device 104 of FIG. 1, or both processing devices.

FIG. 2 is a functional block diagram which illustrates an exemplary processing device 200, which may be used to implement processing device 102, processing device 104, or both devices. Processing device 200 may include a bus 210, a processor 220, a memory 230, a read only memory (ROM) 240, a storage device 250, an input device 260, an output device 270, and a communication interface 280. Bus 210 may permit communication among components of processing device 200. In embodiments in which processing device 200 is used to implement both processing device 102 and processing device 104 in a single processing device, communication interface 280 may not be included as one of the components of processing device 200.

Processor 220 may include at least one conventional processor or microprocessor that interprets and executes instructions. Memory 230 may be a random access memory (RAM) or another type of dynamic storage device that stores information and instructions for execution by processor 220. Memory 230 may also store temporary variables or other intermediate information used during execution of instructions by processor 220. ROM 240 may include a conventional ROM device or another type of static storage device that stores static information and instructions for processor 220. Storage device 250 may include any type of media for storing data and/or instructions. When processing device 200 is used to implement processing device 102, storage device 250 may include one or more databases of a database system.

Input device 260 may include one or more conventional mechanisms that permit a user to input information to processing device 200, such as, for example, a keyboard, a mouse, or other input device. Output device 270 may include one or more conventional mechanisms that output information to the user, including a display, a printer, or other output device. Communication interface 280 may include any transceiver-like mechanism that enables processing device 200 to communicate with other devices or networks. In one embodiment, communication interface 280 may include an interface to network 106.

Processing device 200 may perform such functions in response to processor 220 executing sequences of instructions contained in a computer-readable medium, such as, for example, memory 230, or other medium. Such instructions may be read into memory 230 from another computer-readable medium, such as storage device 250, or from a separate device via communication interface 280.

Overview

In a typical database system, data may be viewed as being stored in tables. A row of the table may correspond to a record in a file. Some database systems may permit data stored in a column of a table to be encrypted. Such database systems may permit a search on data in the encrypted column, provided the data is deterministically encrypted. That is, a search for rows in a table having a particular plaintext value corresponding to deterministically encrypted ciphertext in an encrypted column of the database may be performed. However, as previously mentioned, deterministic encryption always encrypts plaintext items to the same corresponding ciphertext items. Thus, data patterns may be recognizable resulting in information leakage.

Non-deterministic encryption methods such as, for example, use of block ciphers in cipher-block chaining (CBC) mode with a random initialization vector, or other non-deterministic encryption methods, may encrypt the same plaintext data items to different ciphertext data items. For example, non-deterministic encryption according to use of block ciphers in CBC mode with a random initialization vector, may encrypt each block of plaintext by XORing a current block of plaintext with a previous ciphertext block before encrypting the current block. Thus, a value of a ciphertext data item may be based not only on a corresponding plaintext data item and a cryptographic key, but may also be based on other data, such as, for example, previously encrypted blocks of data or a random initialization vector.

Embodiments consistent with the subject matter of this disclosure relate to database systems in which searching may be performed on non-deterministically encrypted data of an encrypted column of a database. In one embodiment, a code may be calculated based on a desired plaintext data item and a cryptographic key. The code may be a message authentication code (MAC), a Hashed Message Authentication Code (HMAC), or other code. The code may be used as an index to an indexing structure, which may have entries organized according to respective codes based on corresponding plaintext data items and a cryptographic key.

In one implementation, the indexing structure may be a B-tree or other indexing structure, which may be used to search for one or more rows in the database having a particular plaintext data item corresponding to encrypted data of an encrypted column of the database. Each of the entries of the indexing structure may include an indexing value, corresponding to a code calculated based on the corresponding plaintext data item and the cryptographic key, and data for accessing a row of a database that includes a corresponding non-deterministically encrypted ciphertext item of the encrypted column of the database.

In another implementation, the indexing structure may include hash buckets allocated for respective items according to a corresponding hash value. A hashed message authentication code may be calculated based on a respective plaintext data item and a cryptographic key. The hash value may be produced by hashing the calculated hashed message authentication code. Each item of a hash bucket may include information for obtaining a database entry including a non-deterministically encrypted data item corresponding to a respective plaintext data item.

In other embodiments, an indexing structure for a non-deterministically encrypted column of a database may be accessed. Each entry of the indexing structure may be organized according to plaintext data items corresponding to non-deterministically encrypted ciphertext items of the encrypted column of the database. Each of the entries of the indexing structure may include one or more references related to the corresponding plaintext data item. The one or more references related to the corresponding plaintext data item may be encrypted and other information in the indexing structure may be unencrypted. When a search is performed, at least a portion of the indexing structure may be loaded into a memory and one of the entries of the indexing structure corresponding may be accessed. The one or more encrypted references of the one of the entries of the indexing structure may be decrypted and used to access a row including a corresponding non-deterministically encrypted ciphertext item of the encrypted column of the database.

In some embodiments, non-deterministic encryption and decryption may be performed using symmetric keys. That is, a cryptographic key may be used to non-deterministically encrypt a data item and the same cryptographic key may be used to decrypt the encrypted data item.

In other embodiments, non-deterministic encryption and decryption may be performed using asymmetric keys. That is, a public cryptographic key may be used to non-deterministically encrypt a data item and a private cryptographic key may be used to decrypt the data.

Exemplary Methods

Database systems typically use some type of indexing scheme for quickly searching data stored in column of a database in order to access particular records or rows. One well-known indexing scheme includes use of a B-tree, although other indexing schemes may also be used in other embodiments. In one embodiment, a new data type, which we call a duplet, may be used with the indexing scheme of the database system. The duplet may include paired data items. For example, the duplet may include a code based on a plaintext item corresponding to a non-deterministically encrypted ciphertext item stored in an encrypted column of the database, and non-deterministically encrypted ciphertext, which may be equal to the non-deterministically encrypted ciphertext item stored in the encrypted column of the database. We refer to the non-deterministically encrypted ciphertext as an E-value.

When the database system inserts or updates data in the database, the database system may keep both portions of the duplet synchronized in a single atomic operation. That is, in some embodiments the database system may not be able to write one portion of the duplet without writing the other portion of the duplet.

In embodiments consistent with the subject matter of this disclosure, the code based on the plaintext item may be a Message Authentication Code (MAC), or other code. In one implementation, the MAC may be a Hashed Message Authentication Code (HMAC), which is a one-way hash computed using a plaintext item and a cryptographic key. The cryptographic key may be equivalent to a cryptographic key used to form the E-value, a second key that may be protected by the key used to form the E-value, or a completely independent key.

Figure 3A:
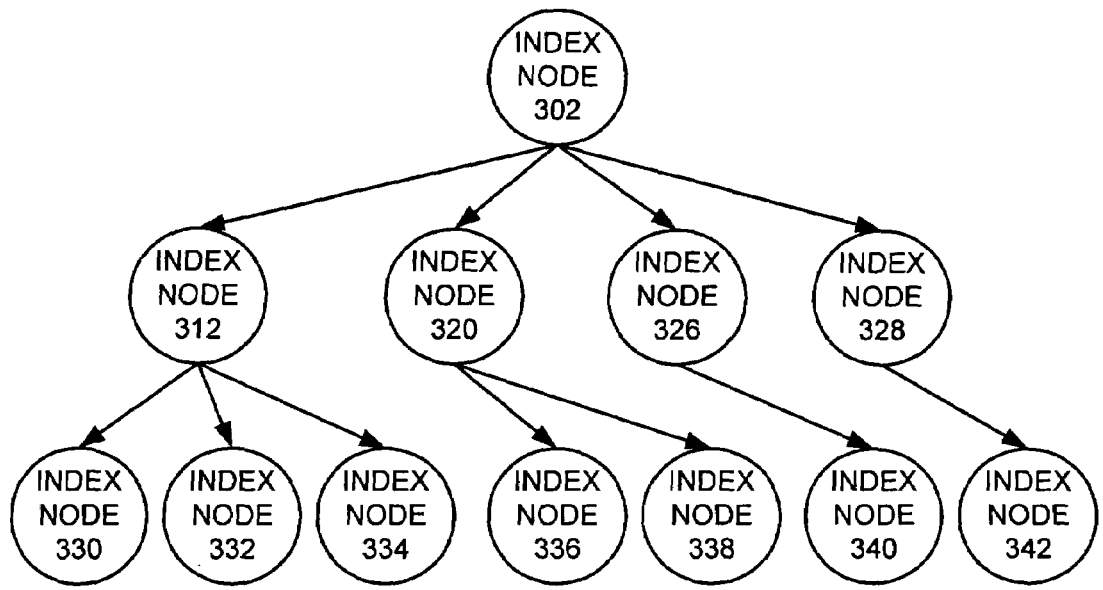
FIGS. 3A-3C illustrate exemplary indexing structures that may be employed in embodiments consistent with the subject matter of this disclosure.

FIG. 3A illustrates an exemplary B-tree which may be used as an indexing structure in embodiments consistent with the subject matter of this disclosure. The exemplary B-tree may include index nodes 302, 312, 320, 326, 328, 30, 332, 334, 336, 338, 340, and 342. Each of the index nodes may include one or more entries. The index nodes, which are not leaf nodes, may include one or more links to other index nodes. For example, index node 302 may include a number of entries and may further include links to other index nodes, such as index nodes 312, 320, 326 and 328. Index node 312 may include a number of entries and may further include links to other index nodes, such as index nodes 330, 332 and 334, which in this example, may be leaf nodes. Index node 320 may include at least one entry and a link to index nodes 336 and 338, which in this example, may be leaf nodes. Index node 326 may include at least one entry and a link to index node 340, which in this example may be a leaf node. Index node 328 may include at least one entry and a link to index node 342, which in this example may be a leaf node.

Figure 3B:
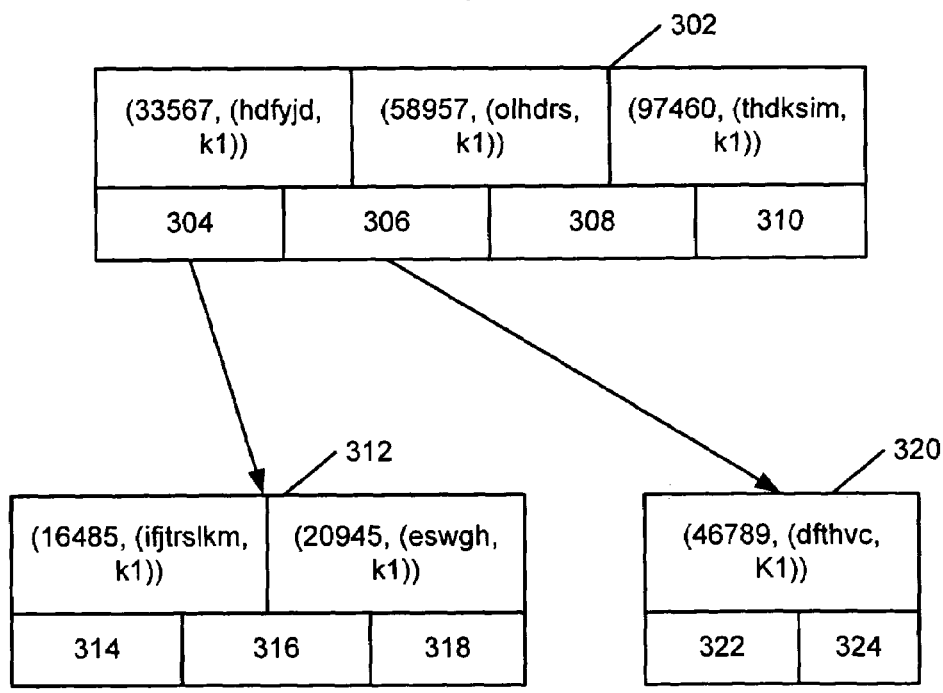

FIG. 3B illustrates a more detailed view of exemplary index nodes 302, 312 and 320 of FIG. 3A consistent with the subject matter of this disclosure. In this exemplary B-tree indexing structure, each entry in the index nodes may include a duplet. However, duplets may be used with other indexing structures in other embodiments. As shown in FIG. 3B, each index node may include one or more items and each of the one or more items may include a duplet. For example, index node 302 may include a first item having a duplet including an index value, which may be a code such as, for example, 33567, which may be a MAC or an HMAC based on a first plaintext item, and an E-value, hdfyjd, corresponding to the first plaintext item encrypted by key k1, a second item having a duplet including an index value, which may be a code, such as, for example, 58957, which may be a MAC or an HMAC based on a second plaintext item, and E-value, olhdrs, corresponding to the second plaintext item encrypted by key k1, and a third item having a duplet including an index value, which may be a code, such as, for example, 97460, which may be a MAC or an HMAC, based on a third plaintext item, and an E-value, thdksim, corresponding to the third plaintext item encrypted by key k1. As can be seen in FIG. 3B, index node 312 may include two entries. A first entry of index node 312 may include a duplet having an index value, 16485, based on a fourth plaintext item and an E-value, ifjtrslkm, corresponding to the fourth plaintext item encrypted by key k1. A second entry of index node 312 may include a duplet having an index value, 20945, based on a fifth plaintext item and an E-value, eswgh, corresponding to the fifth plaintext item encrypted by key k1. Index node 320 may include one entry including a duplet. The duplet may include an index value, 46789, based on a sixth plaintext item and an E-value, dfthvc, corresponding to the sixth plaintext item encrypted by key k1.

Index node 302 may include a link 304, which may be a link to index node 312 having entries with corresponding index values less than index value 33567 of index node 302, a link 306, which is a link to index node 320 having an entry with a corresponding index value greater than index value 33567 and less than index value 58957 of index node 302, a link 308, which may link index node 302 to index node 326 having one or more entries with respective index values greater than index value 58957 and less than index value 97460 of index node 302, and a link 310, which may link index node 302 to an index node 328 having one or more entries with respective index values greater than index value 97460 of index node 302.

Further, index node 312 may include a link 314 to index node 330, which may include one or more entries having index values less than index value 16485 of index node 312, a link 316 to index node 332, which may include one or more entries including index values greater than index value 16485 and less than index value to 20945 of index node 312, and a link 318 to index node 334, which may include one or more entries including index values greater than index value 20945 of index node 312. Index node 320 may include a link 322 to index node 336, which may include one or more entries including index values less than index value 46789 of index node 320, and a link 324 to index node 338, which may include one or more entries including index values greater than index value 46789 of index node 320.

Each of the index node entries may include information indicating a data type of the corresponding plaintext data item (not shown) and may include a reference or pointer to corresponding non-deterministically encrypted ciphertext of an encrypted column of the database (not shown). Further, each of the index nodes may include a different number of items than as shown in the exemplary indexing structure of FIG. 3B. For example, index nodes 302, 312, or 320 may have a different number of items included within the respective index nodes than as shown in FIG. 3B.

Figure 3C:
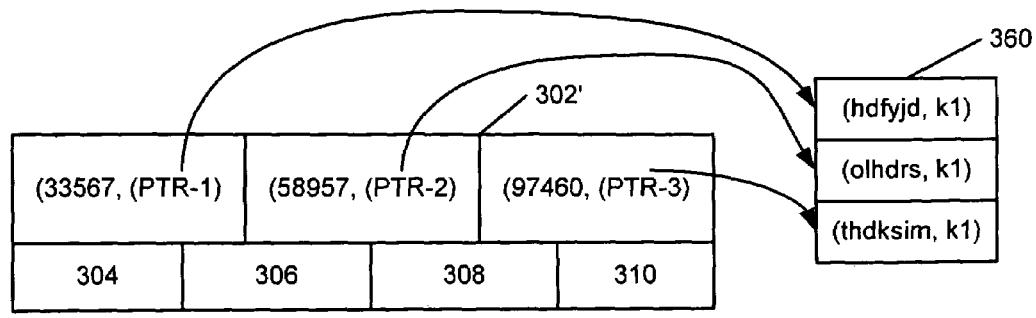

The indexing structure of FIGS. 3A and 3B is an exemplary indexing structure. Although, FIG. 3B illustrates each item of the exemplary indexing structure including an index value and an E-value, in other embodiments, each item of an indexing structure may include an index value, with a corresponding E-value residing in a separate data structure. For example, exemplary index node 302' of FIG. 3C is similar to index node 302 of FIG. 3B. However, each of the items of index node 302' may include a first entry of a duplet, which in this example is an index value, and a reference or pointer to a corresponding E-value included in a data structure 360, which may be a table, an array, or other data structure. Although data structure 360 illustrates the E-values, corresponding to index node 302', being in consecutive locations within data structure 360, the E-values may be arranged in locations within data structure 360, which are not consecutive or contiguous.

In embodiments consistent with the subject matter of this disclosure, an indexing structure, such as, for example, the indexing structure of FIGS. 3A-3C, may be updated by processing device 102 by adding an item to an index node or by adding a new index node that includes a new item, such that links corresponding to the new item in the indexing structure perform in the manner illustrated in FIGS. 3A-3C. That is, each new item added to a node in the indexing structure, which is not a leaf node, may have a link pointing to an index node including one or more items having a respective indexing value that is less than the indexing value of the added item and a second link pointing to an index node including one or more items having a respective indexing value that is greater than the indexing value of the added item. Further, when a new index node is added to the indexing structure, processing device 102 may update at least one of the existing links of the indexing structure to point to the new index node. Each new item that processing device 102 may add to the indexing structure may include a respective index value and either a corresponding E-value or a reference to a corresponding E-value. When a reference to a corresponding E-value is stored in an item of the indexing structure, the corresponding E-value may be stored in a separate data structure, such as, for example, a table, an array, or other data structure.

Figure 4:
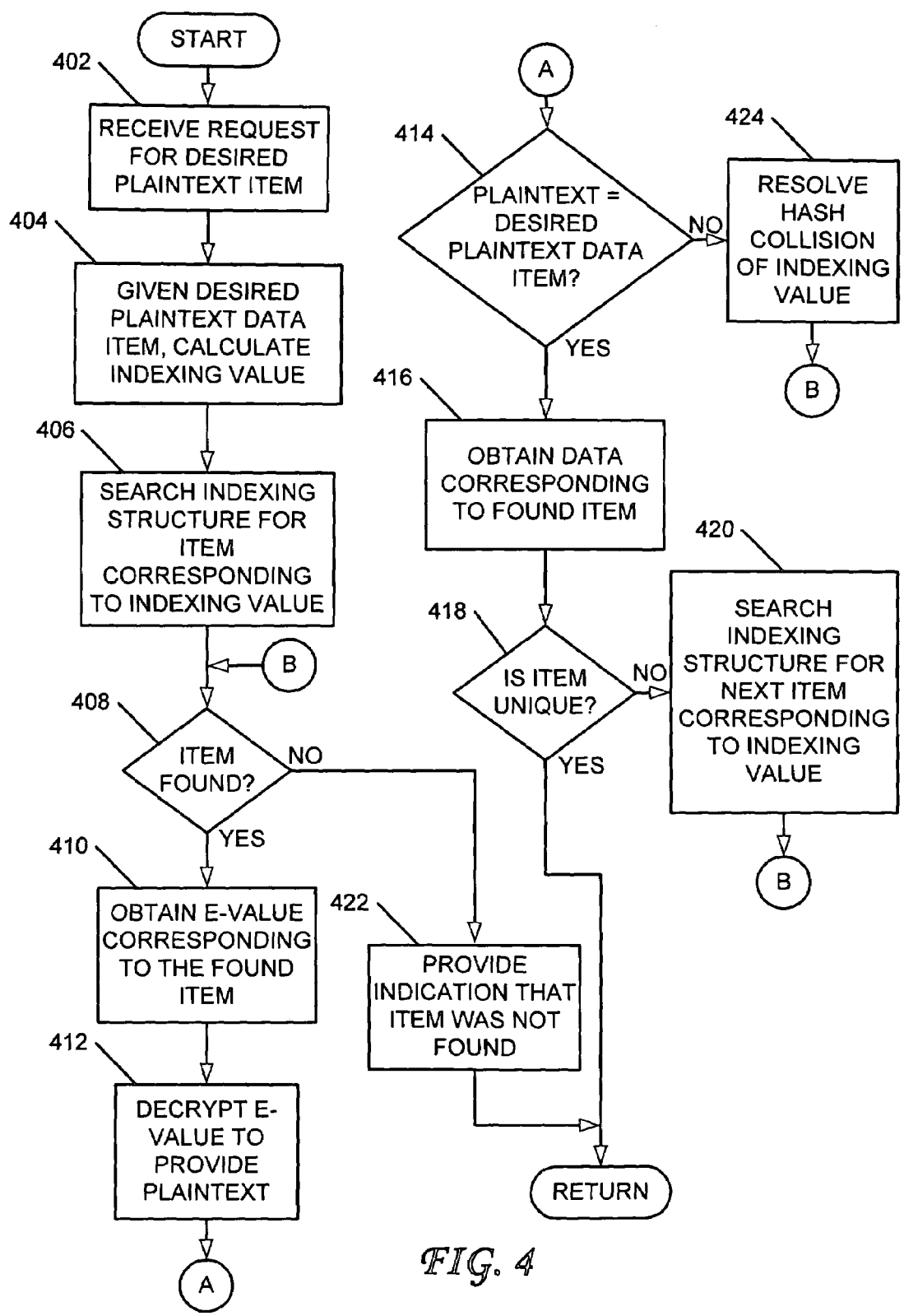
FIG. 4 is a flowchart that illustrates a method that may be performed consistent with the exemplary indexing structures of FIGS. 3A-3C.

FIG. 4 is a flowchart that illustrates an exemplary process for using an indexing structure, such as, for example, the exemplary indexing structures of FIGS. 3A-3C, to search for non-deterministically encrypted data in a database in embodiments consistent with the subject matter of this disclosure. First, processing device 102 may receive a request for a desired data item that may be included in a database of processing device 102 (act 402). The request may be from a requester such as, for example, a user or an application of processing device 102 or from a requester such as, for example, a user or an application of another processing device, such as, for example, processing device 104, which may communicate with processing device 102 via a network, such as, for example, network 106. The request may be a search request or other request that includes finding a desired data item and may include a plaintext form of the desired data item. Given the desired plaintext data item, processing device 102 may calculate, transparently with respect to the requester, an indexing value, which may be a code, such as, for example, a MAC or a HMAC based on the desired plaintext data item and a cryptographic key (act 404). Processing device 102 may then access and search an indexing structure of the database in an attempt to locate data corresponding to the desired plaintext data item (act 406). If the indexing structure is, for example, a B-tree, processing device 102 may examine index values of duplets within index nodes of the B-tree to traverse the B-tree in the attempt to locate the desired data.

Next, processing device 102 may determine whether the desired item was found (act 408). If the desired item was not found, then processing device 102 may return an indication that the desired data was not found in the database (act 422). Otherwise, processing device 102 may obtain an E-value of a duplet corresponding to the indexing value calculated during act 404 (act 410). Processing device 102 may then decrypt the E-value to provide corresponding plaintext (act 412). The corresponding plaintext may then be compared with the plaintext form of the desired data item provided during act 402 (act 414). If processing device 102 determines that the compared plaintexts are equal, then the data corresponding to the found item within the indexing structure may be obtained from the database and may be returned to the requester (act 416). That is, the found item of the indexing structure may include a reference to the corresponding data stored in the database. Processing device 102 may then determine whether the found data item is unique (act 418). In one implementation, processing device 102 may determine whether the found data item is unique based on whether the found data item is a primary key in a database, based on a uniqueness indicator that may be included in the database or in an entry of an indexing structure, or based on other criteria. If processing device 102 determines that the found data item is unique in the database, then the process is completed. Otherwise, processing device 102 may search the indexing structure for a next item corresponding to the indexing value (act 420). Processing device 102 may then repeat acts 408-424.

If the comparison performed during act 414 indicates that the plaintexts are not equal, then processing device 102 may determine that a hash collision occurred. That is, two different plaintext items generate the same index value when using the same cryptographic key. The possibility of such an occurrence is rare, but possible. When processing device 102 determines that a hash collision occurred, processing device 102 may employ any one of a number of well-known methods for resolving a hash collision (act 424). For example, in one embodiment, items having identical codes or indexing values (indicating hash collisions) may be stored in contiguous locations of a node of the indexing structure. When a hash collision is determined to have occurred, processing device 102 may search the contiguous items within the node to determine whether any of the contiguous items within the node are associated with an E-value which, when decrypted, matches the plaintext of the desired item. Once the hash collision is resolved, processing device 102 may repeat acts 408-414.

Figure 5:
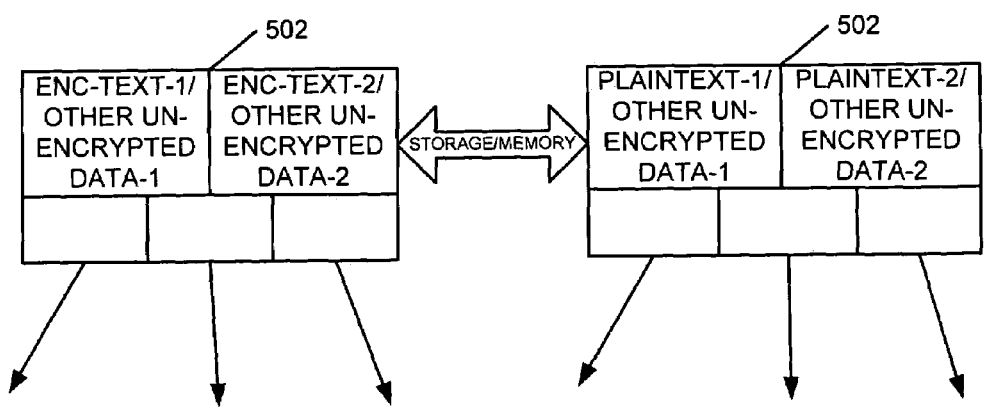
FIG. 5 illustrates an exemplary indexing structure that may be employed in another embodiment consistent with the subject matter of this disclosure.

FIG. 5 illustrates another exemplary indexing structure which may be used in another embodiment consistent with the subject matter of this disclosure. FIG. 5 illustrates an exemplary B-tree indexing structure, although other indexing structures may be used in other embodiments. A portion of indexing structure 502 on the right side of FIG. 5 illustrates an index node of indexing structure 502 as it may be when it resides in memory. Indexing structure 502 in memory may include nodes built using plaintext items as index values. Each node may include an index value, or plaintext item, as well as other data pertaining to the plaintext item, along with other unencrypted data. For example, node 502, in memory, may include two items, a first item may include a respective plaintext item, plaintext-1, as an index value and other data related to the plaintext item, and unencrypted data-1, which may be other unencrypted information of the first item. A second item of node 502 may include another respective plaintext item, plaintext-2, as an index value and other data related to the plaintext item, and unencrypted data-2, which may be other unencrypted information of the second item. For example, if the indexing structure is built for searching employee names in a database, the index values may be the employee names. Searching on such an indexing structure may be performed by traversing the indexing structure until the desired name is found in a node of the indexing structure or until a determination can be made that the desired name is not included in the database when the desired name is not found.

The left side of FIG. 5 illustrates indexing structure 502 as it may be when saved in storage within the database system. The saved version of indexing structure 502 may include encrypted versions of all plaintext references, for example, enc-text-1 of the first item of node 502 and enc-text-2 of the second item of node 502. That is, all plaintext references, including the index values, may be saved in encrypted form while the organization of the indexing structure remains unchanged. In other words, an order of items in index nodes and the linkages between nodes may be arranged according to the plaintext index values although all plaintext references, including the index values, may be saved in encrypted form. Further, any other information related to a plaintext item that may be used by the index, such as, for example, plaintext statistics, may also be encrypted. The plaintext references used by the indexing structure, including the information related to a plaintext item, may be encrypted in the saved indexing structure by using the same key that was used to encrypt the corresponding data in the database or by another key.

FIG. 5 illustrates an exemplary node of an indexing structure having two items. In other embodiments, more or fewer items may be stored within a node of the indexing structure.

Figure 6:
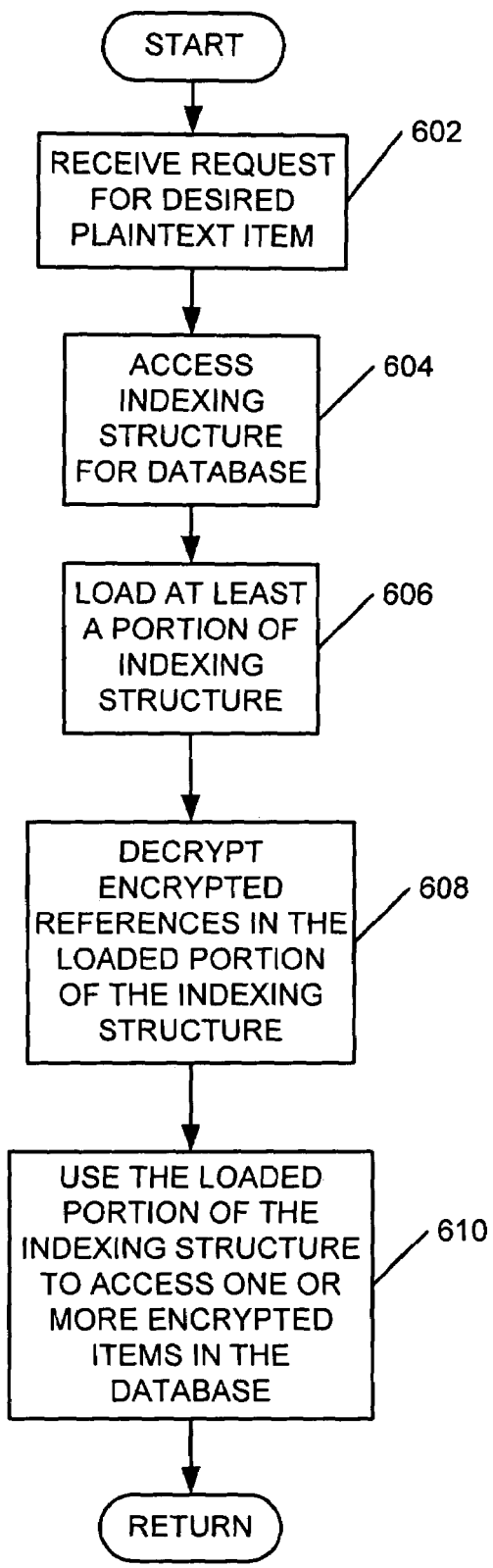
FIG. 6 is a flowchart that illustrates a method that may be performed consistent with the exemplary indexing structure of FIG. 5.

FIG. 6 is a flowchart that illustrates an exemplary process for using an indexing structure, such as, for example, the exemplary indexing structure of FIG. 5, to search for non-deterministically encrypted data in a database in embodiments consistent with the subject matter of this disclosure. First, processing device 102 may receive a request for a desired data item that may be included in a database of processing device 102 (act 602). The request may be made directly by a requester such as, for example, a user or an application, via processing device 102 or via another processing device, such as processing device 104 via a network, such as network 106. The request may be a search request and may include a plaintext form of the desired data item. Next, processing device 102 may access an indexing structure of the database in order to perform a search for data in the database that corresponds to the desired data item (act 604). Processing device 102 may then load at least a portion of the indexing structure into dynamic storage, such as memory 230 (act 606). Processing device 102 may then decrypt encrypted references in the loaded portion of the indexing structure (act 608) and may use the loaded portion of the indexing structure to find and access one or more non-deterministically encrypted data items in the database (act 610).

In one embodiment, processing device 102 may decrypt the encrypted references of the indexing structure as an index page or portion of the indexing structure is loaded into memory 230. In such an embodiment, searching may then be performed using the corresponding plaintext references and other information from the indexing structure. In another embodiment, the plaintext references from the indexing structure may be decrypted as the search is performed, such as, for example, when a plaintext reference from the index is needed.

The exemplary method described above, with reference to FIG. 6, may be used to search for data pertaining to a particular data item, such as, for example, an equality search, may be used to search for data pertaining to a range of data values, such as, for example, a range search, or may be used to perform a search for information that is similar to a particular data item, such as, for example, a fuzzy search.

Another exemplary method that may be employed in embodiments consistent with the subject matter of this disclosure is explained with reference to FIG. 7. This method may be used with database systems that support hash-based indexes. According to the exemplary method of FIG. 7, processing device 102 may receive a search request or other request for finding database data related to a plaintext item (act 702). The request may be made directly by a requester such as, for example, a user or an application, via processing device 102 or via another processing device, such as processing device 104 via a network, such as network 106. Processing device 102 may calculate a HMAC over the plaintext item using a cryptographic key (act 704). Processing device 102 may then hash the calculated HMAC to produce a hash value (act 706). Processing device 102 may use the hash value as an index value to a hash bucket within a hashed-based indexing structure 710 to obtain information related to the requested plaintext data item based on an indexed entry of hash-based indexing structure 710 (act 708). Because the hash value is calculated from a HMAC based on a plaintext item, hash buckets of the hash-based index may be allocated for items corresponding to plaintext items of data according to a respective HMAC of the corresponding plaintext items of data. In at least some embodiments, hash-based indexing structure 710 may include a link to an item in a database having encrypted information related to the requested plaintext data item. The encrypted information may include non-deterministically encrypted data.

Figure 7:
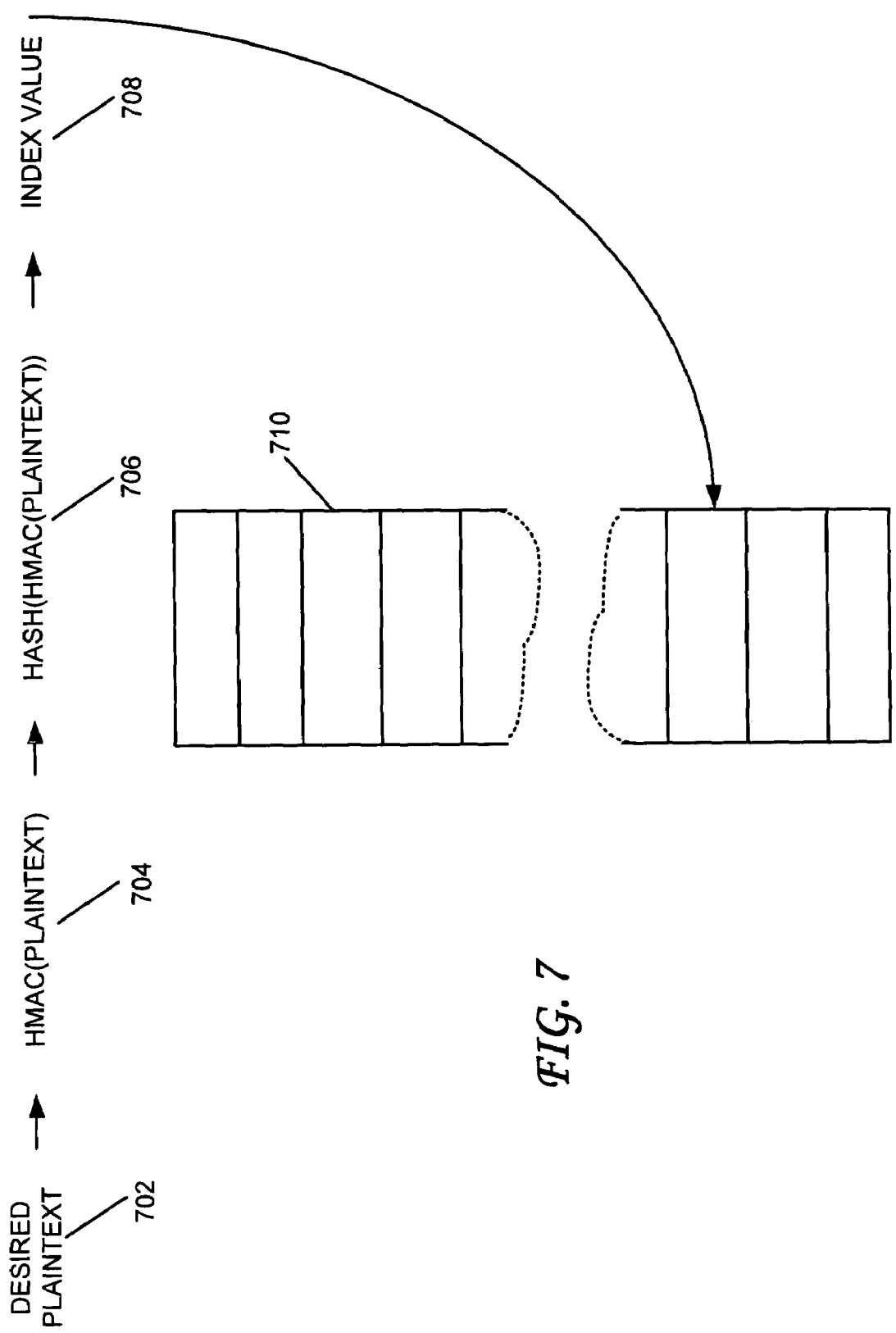
FIG. 7 is a flowchart that illustrates a method that may be performed in a third embodiment consistent with the subject matter of this disclosure.

The exemplary hashed-based indexing structure method illustrated by FIG. 7 avoids possible leakage of information that may occur as a result of an arrangement of hash buckets according to an index hash function.

Conclusion

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above description may contain specific details, they should not be construed as limiting the claims in any way. Other configurations of the described embodiments are part of the scope of this disclosure. Further, implementations consistent with the subject matter of this disclosure may have more or fewer acts than as described, or may implement acts in a different order than as shown. Accordingly, the appended claims and their legal equivalents should only define the invention, rather than any specific examples given.

We claim as our invention:

1. A method for performing a search on non-deterministically encrypted data in a database system, the method comprising:

determining, by a processor and transparently to a user, an indexing value for a desired plaintext item of data provided by the user, the determining further comprising:
calculating a message authentication code based on the desired plaintext item of data and a cryptographic key, and
hashing the calculated message authentication code to determine the indexing value;

using, by the processor, the indexing value to access a corresponding entry in an indexing structure to obtain a database entry including non-deterministically encrypted ciphertext corresponding to the desired plaintext item of data, the indexing structure including a first item of each of a plurality of paired data items, and either a second item of each of the plurality of paired data items or a reference to the second item of each of the plurality of paired data items, the first item of each of the plurality of paired data items being an indexing data item having a value based on applying a hashed message authentication code, using the cryptographic key, over a respective plaintext item of data and the second item of each of the plurality of paired data items being non-deterministically encrypted ciphertext corresponding to the respective plaintext item of data;

decrypting, by the processor, the second item of a corresponding one of the plurality of paired data items; and comparing, by the processor, the decrypted second item of the corresponding one of the plurality of paired data items with the desired plaintext item of data to determine whether a hash collision occurred.

2. The method of claim 1, wherein the indexing structure includes a plurality of hash buckets allocated for respective items according to a hashed message authentication code of a corresponding plaintext item of data.

3. A method for providing a remote database for performing a search on non-deterministically encrypted data in a database system, the method comprising:

receiving a remote request from a requester, via a network, to search the non-deterministically encrypted data in the database system for a database entry corresponding to a desired plaintext data item;

calculating, by a processor and transparently to the requester, a code based on the desired plaintext data item and a cryptographic key;

using, by the processor, the code as an index to an indexing structure to obtain the database entry corresponding to the desired plaintext data item, the indexing structure including a plurality of hash buckets for respective items according to a corresponding hash value, the corresponding hash value being determined by calculating a hashed message authentication code based on a corresponding plaintext data item and the cryptographic key, and hashing the calculated hashed message authentication code to produce the corresponding hash value;

decrypting, by the processor, a non-deterministically encrypted item of an entry of the indexing structure corresponding to the code;

comparing, by the processor, the decrypted non-deterministically encrypted item of the entry of the indexing structure with the desired plaintext data item to determine whether a hash collision occurred; and returning data to the requester, the returned data including the database entry corresponding to the desired plaintext data item obtained from the database system.

4. The method of claim 3, wherein the calculating, by a processor, of a code based on the desired plaintext data item and a cryptographic key further comprises calculating a hashed message authentication code.

5. The method of claim 3, wherein the indexing structure further comprises a plurality of items, each of the plurality of items including at least a first item of a duplet and either a second item of the duplet or a reference to the second item of the duplet, the first item of the duplet comprises a code corresponding to a respective plaintext data item, and the second item of the duplet comprises non-deterministically encrypted ciphertext corresponding to the respective plaintext data item.

6. The method of claim 3, wherein the indexing structure includes a B-tree.

7. A machine-readable medium having instructions stored therein for at least one processor, the instructions comprising:

instructions for calculating a message authentication code based on a desired plaintext item of data and a cryptographic key, and instructions for hashing the calculated message authentication code to determine an indexing value;

instructions for using the indexing value to access a corresponding entry in an indexing structure to obtain a database entry including non-deterministically encrypted ciphertext corresponding to the desired plaintext item of data, the indexing structure including a first item of each of a plurality of paired data items, and either a second item of each of the plurality of paired data items or a reference to the second item of each of the plurality of paired data items, the first item of each of the plurality of paired data items being an indexing data item having a value based on applying a hashed message authentication code, using the cryptographic key, over a respective plaintext item of data and the second item of each of the plurality of paired data items being non-deterministically encrypted ciphertext corresponding to the respective plaintext item of data;

instructions for using the indexing value to obtain a second item of a paired data item of the corresponding entry of the indexing structure;

instructions for decrypting the second item of the paired data item of the corresponding entry of the indexing structure; and instructions for comparing the decrypted second item of the corresponding entry of the indexing structure with the desired plaintext item of data to determine whether a hash collision occurred.

* * * * *